United States Patent [19]

Kastan et al.

[11] 3,791,234

[45] Feb. 12, 1974

[54] A RETENTION MEMBER

[75] Inventors: Howard Kastan, Northridge; Joe C. Pena, La Canada, both of Calif.

[73] Assignee: Lockheed Aircraft Corporation, Burbank, Calif.

[22] Filed: May 8, 1972

[21] Appl. No.: 251,093

Related U.S. Application Data

[62] Division of Ser. No. 38,396, May 18, 1970, Pat. No. 3,695,779.

[52] U.S. Cl. .............................. 74/579 R, 416/141
[51] Int. Cl. .............................................. F16c 5/00
[58] Field of Search ..... 74/579 E, 579 R; 416/135, 416/138, 131, 141

[56] References Cited
UNITED STATES PATENTS

| | | | |
|---|---|---|---|
| 3,310,119 | 3/1967 | Watson | 416/141 X |
| 3,667,863 | 6/1972 | Breuner | 416/141 X |
| 1,845,245 | 2/1932 | Cutler | 74/579 E |
| 1,853,712 | 4/1932 | Woolson | 74/579 E X |
| 2,995,953 | 8/1961 | DeFazi | 74/579 E |
| 3,334,886 | 8/1967 | Caunt | 74/574 X |

*Primary Examiner*—Benjamin W. Wyche
*Assistant Examiner*—F. D. Shoemaker
*Attorney, Agent, or Firm*—George C. Sullivan; Frank L. Zugelter

[57] ABSTRACT

A blade retention member which is compressible and torsionable in installation and operation of a rotor control system, the torsional stiffness of the member decreasing with increasing rotor blade speed, the compressible stress not exceeding the strength of the material out of which the member is fabricated. Its inboard end is fixedly connected to either the rotor blade or a movable hub enveloping it at its inboard end, while its outboard end is fixedly connected to the fixed hub or extension thereof in the rotor system. Means are also provided in the system for isolating bearing means supporting the blade from the blade retention member. The member itself comprises a plurality of circumferentially spaced parallel rails spacedly disposed radially equidistant and arcuately about from a common centerline coincident with the feathering axis for the blade.

14 Claims, 12 Drawing Figures

FIG_2

FIG_3

FIG_4

FIG_5

FIG_8  PLAN VIEW — WITHOUT FEATHERING

FIG_9  PLAN VIEW — WITH FEATHERING

FIG_10

FIG_11

FIG_12

NOTE: FOR C-T PACK 15, VALUE OF $K_\theta$ AT ZERO C.F. AND SLOPE OF CURVE MAY BE CONTROLLED BY DESIGN.

3,791,234

A RETENTION MEMBER

This is a divisional application on our application filed May 18, 1970, Ser. No. 38,396, now U.S. Letters Patent No. 3,695,779, issued Oct. 3, 1972.

BACKGROUND OF THE INVENTION

1. Field of Invention

The field of art to which the invention is most likely to pertain may be generally located in the class of apparatus relating to retaining members for a helicopter rotor blade whereby the blade is prevented from separating from its hub. Classes 74, Machine Elements and Mechanisms; 170, Motors, Fluid Current; and 308, Machine Elements, Bearings and Guides, United States Patent Office classifications, appear to be the applicable general areas of art in which subject matter performing such general function have been classified in the past.

2. Description of the Prior Art

A non-similar blade retaining member is disclosed in U.S. Letters Patent No. 3,434,372, issued March 25, 1969.

The concept of this invention and disclosure of subject matter constituting the preferred embodiment of the invention are believed to be completely novel. A brief reference with respect to prior art practice follows hereinafter in order to familiarize the reader therewith and thereby more fully appreciate Applicants' contribution to the advancement of the particular arts and sciences which are involved.

Existing helicopter rotor systems include tension-torsion packs or thrust bearings, such as disclosed in U.S. Letters Patent No. 3,434,372, which become increasingly stiff in torsion as the rotational speed of rotor blades increases. At normal operating rpm, the rotor control system must overcome such stiffness in order to control the pitch or feathering the rotor blades. Existing rotor control system components are sized to accommodate these forces and, in large helicopters, servo systems are incorporated to aid the pilot in such control.

Generally, this invention comprehends connection of a rotor blade to the inboard end of a compressionable and torsionable member having an outboard end fixedly connected to a fixed rotor hub or arm. Such connection is made by means of a movable hub or cuff-like element enveloping or encompassing such member and which is fixedly linked to the blade, although the blade may be so designed at its inboard end to accommodate such a connection without the addition of a separate movable hub or cuff-like element. The member which actually undergoes compression and torquing is elongate, torsionally flexible and axially stiff. These characteristics of such member are inherent in elements designated generally as rails, which decrease in lateral bending stiffness with increase in centrifugal force resulting from increased blade speed and which may be spoken of in terms of effect of a negative spring. Such effect reduces the forces required from the rotor system to control a rotor blade at normal operating rotational speeds. At normal operational rpm, the control system for the rotor readily overcomes initial or inherent stiffness against control of pitch or feathering of the rotor blades, with utilization of this invention.

SUMMARY

An object of this invention is to provide for a novel, efficient and effective attachment of a feathering portion of a helicopter rotor blade to a non-feathering portion of a helicopter rotor hub.

An object of this invention is to provide a novel blade retention member.

A further object of this invention is to provide a novel compression-torsion pack.

An object of this invention is to provide design of a rotor system in which relatively small forces are required to control cyclic and collective pitch of a helicopter's rotor blades.

Another object of this invention is to provide avoidance, prevention or elimination of tumbling of a gyroscope during rpm decay of a gyroscopically controlled rotor, as it is well known in practice that during such decay, the centrifugal forces applied to a blade or blades approaches zero at the same rate that the gyroscopic stiffness approaches zero.

A further object of this invention is to provide reduction in collective control loads simply by reducing the moment required to feather the blades as the result of utilization of our novel pack.

A further object of this invention is to provide replacement for conventional axial thrust bearings or thrust bearings.

A further object of this invention is to provide savings in weight and space in utilization of gyroscope and rotor control systems.

Another object of the invention is to provide improved pilot handling qualitites of the overall vehicle.

A further object of the invention is to provide a less expensive and longer life for a rotor system as compared to tension-torsion devices heretofore used in regard to rotor blades, an example of which is shown in U.S. Pat No. 3,434,372.

An object of this invention is to provide absorption of centrifugal loads generated by a rotor blade and transmitted to the rotor hub. These and other objects and advantages of the invention will become more fully apparent upon a complete reading of the following description, appended claims thereto, and the accompanying drawing.

Figure 5:
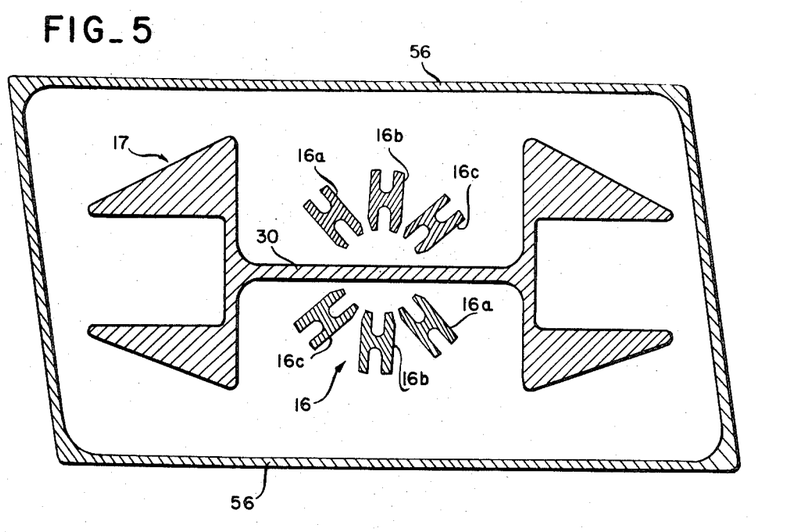
FIG. 5 is a view taken on line 5—5 of FIG. 3.

Referring now to the drawing in which like reference characters refer to corresponding numerals in the following description, numeral 15 generally refers to the blade retention member or compression-torsion C-T pack comprising an assembly of two identical components 15a, 15b. Each component 15a, 15b comprises an integral unit including a plurality of circumferentially spaced H-sectioned or H-configured (FIG. 5) flexible elements or rails 16 disposed radially equidistant from and arcuately about a common centerline coinciding with the feathering axis of a fixed rigid hub 17. In the instant embodiment, three parallel rails 16a, 16b, 16c are integrally formed between common end fitting material constituting each end portion 18, 19 for connection to a rotor blade 20 and rotor hub 17, respectively.

When installed in its hub assembly, the compression-torsion (C-T) pack 15 may be categorized as a "structural machine," i.e., it achieves motions of the magnitude of a mechanism by means of structural deformation, yet its deformations remain elastic and well within the strength limitations of the material from which it is made, and the structural stability of its elements or member 16. In this regard, pack 15 is similar to a flexure pivot, but with regard to the centrifugal load to which it is subjected, pack 15 functions as an automatic device for reducing or eliminating its own feathering stiffness while enhancing its fatigue life. It is quite different in its structure and functions from previously developed flexure devices, as will appear from a reading of this disclosure and the theory and principles on which this invention is based and described hereinafter.

Figures 1, 6, 7:
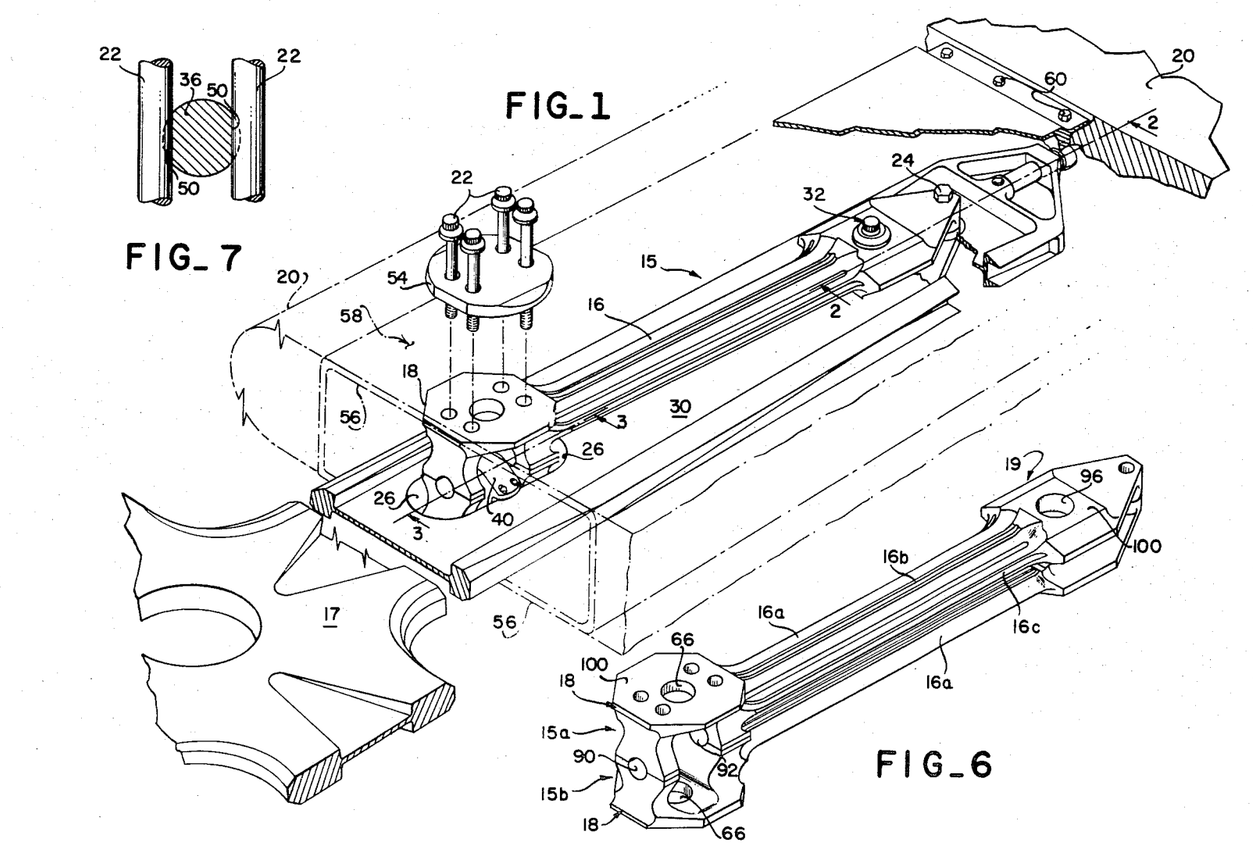
FIG. 1 is a perspective view of an embodiment of the invention disposed in its environmental surroundings.
FIG. 6 is a perspective view of a machined element constituting the compression-torsion pack or blade retention member.
FIG. 7 is a sectional view taken on line 7—7 of FIG. 3.
Figures 2, 3:
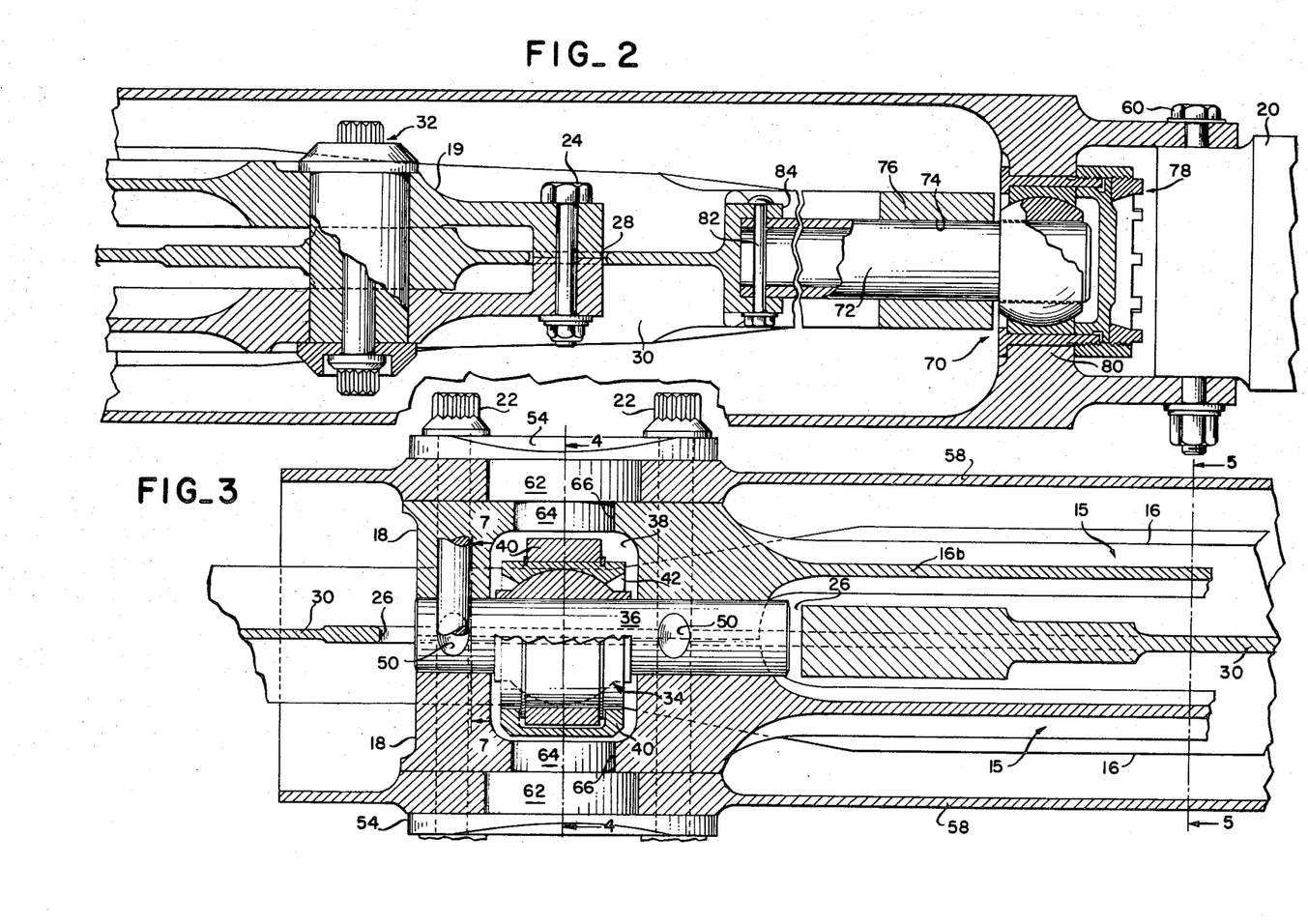
FIGS. 2 and 3 are elevational views, partly in section, of the compression-torsion pack in such surroundings.

The two halves 15a, 15b of pack 15 are rigidly connected or attached to each other at both end portions 18, 19, say, by boltnut means 22, 24, respectively, and as shown in FIGS. 1, 2, 3. Apertures 26, 28 are provided in a central portion 30 of hub 17, considered as an extended arm thereof, for abutment of the corresponding end portions 18, 19 on the mated halves 15a, 15b of pack 15. Pack 15 is installed in its hub assembly at its outboard mounting end portion 19 by pin-and-bolt means 32 vertically disposed through end portion 19 and central portion or arm 30 of hub 17; i.e., pack 15 is pinned vertically and clamped horizontally at this point. At inboard mounting end portion 18, the inboard end of pack 15 is fully constrained in movement against vertical and horizontal axes in the following manner.

Figure 4:
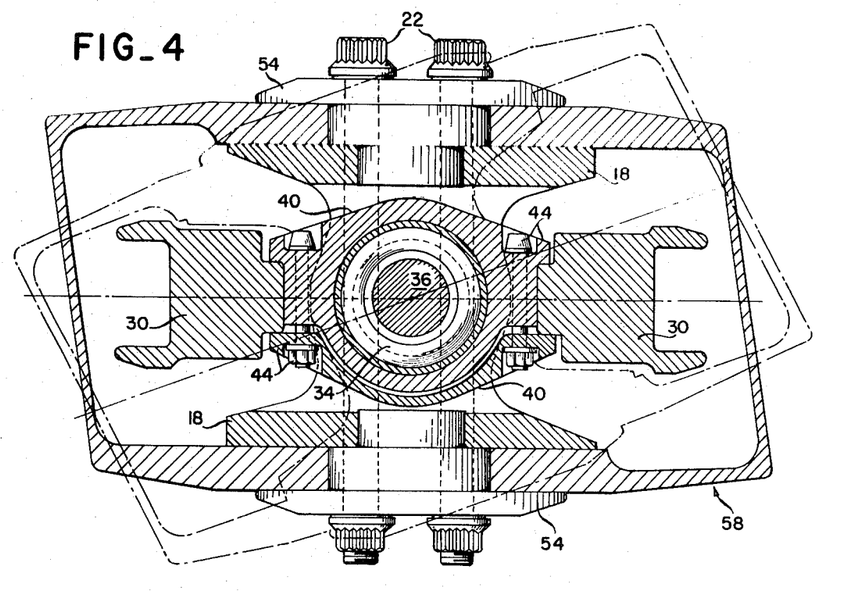
FIG. 4 is a view taken on line 4—4 of FIG. 3, with phantom-line disposition added.

An inboard feathering spherical bearing means 34 mounted on a shaft 36 is disposed in a cavity 38 formed in this configuration of pack 15 by assembly and securement of its end portions 18 of pack 15. Spherical bearing means 34 is free to slide axially on shaft 36, however, it is clamped into a stationary position relative to hub arm 30 by a clamping means 40 fixedly encircling its housing 42 and having a portion clamped to arm 30 by suitable lug-and-bolt connections 44 as shown in FIGS. 3, 4. Shaft 36 is captured, in the instant embodiment, by assembled inboard end portions 18 as shown in FIGS. 3 and 7, although such capture is not critically necessary for operation so long as shaft 36 doesn't escape from pack 15 during operation. As means 22 extend through their respective bores in mated end portions 18, they seat in spaced parallel saucer-like grooves 50 formed in shaft 36. Inboard end portions 18 thus are prevented from rotating about an in-plane axis, which lies within the lateral span or width of arm or web 30, and likewise prevented from rotating about a vertical axis, say, for example, through the center of cavity 38 and bearing means 34.

In conjunction with means 22, a pair of large flat-headed shear or thrust pins 54 is provided for securing pack 15 to opposing walls 56 (FIG. 1) of a movable hub or cuff-like member 58 (shown in phantom in FIG. 1) enveloping pack 15 and securely affixed as at 60 to rotor blade 20. Means 22 clamp together the heads of the shear pins 54, cuff-like member 58 and pack 15. The body 62 of each of the shear pins 54 extends through cuff-like member 58 and includes a smaller diametrical body 64 projecting into respective openings 66 (FIG. 6) provided in each end portions 18. Consequently, mated inboard end portion 18 of pack 15 are limited to rotational movement only and which is associated with a feathering or change in pitch of blade 20 along its feathering axis.

It should be noted that means 22 connected to shear pins 54 and bearing shaft 36, as well as the movable hub 58 and pack halves 15a, 15b, provide for the advantage of stabilization for shear pins 54 against the tilting moments associated with offset, single shear joints. Furthermore, means 22 serve, in the instant embodiment, as centrifugal keeper for bearing shaft 36, as the latter is captured thereby and is prevented from escape in its position in cavity 38 and pack 15. This keeper advantage is generally referred to as a fail-safe capability. Another additional fail-safe capability for the centrifugal aspect of this retention system would be a hardened, spherically faced steel button (not shown) installed in the outboard end of bearing shaft 36 for engagement with a bumper stop (not shown) incorporated into the fixed hub or central portion 30. Thus, if all elements of the C-T pack 15 were to fail, the centrifugal force from blade 20 and movable hub 58 would axially displace the bearing shaft 36 outboard about ⅛ inch until engagement with such a bumper stop.

It should now be apparent that pack 15 is isolated from flapping and chordwise forces transmitted from movable hub 58 (and, of course, blade 20) through mated inboard end portions 18 of pack 15, through shaft 36, through bearing means 34, clamping means 40, to the fixed arm or web 30 or hub 17, while feathering bearing means 34 is in turn isolated from the centrifugal force generated by rotation of blade 20.

A second feathering bearing means 70 is incorporated at the outboard end of arm or web 30, serving the same purpose as that of inboard bearing means 34, viz., providing support for feathering blade 20 and cuff-like member 58. Both bearing means 34, 70 are of the spherical type and well known in the art. Bearing means 70 is also geometrically aligned with the feathering axis for rotor blade 20, and is rotatably mounted on one end of a spindle 72 seated in a bore 74 defined in a terminal block 76 integrally provided on arm or web 30. Suitable means 78 is provided for retaining bearing means 70 in proper position and in respect to an inwardly depending annular projection 80 integrally formed on cuff-like member 58. The other (inner) end of spindle 72 is securely connected to arm 30 as shown in FIG. 2 by means of pin 82 and a cup 84 integrally formed in the central portion of arm 30 and in which such inner end is seated.

THEORY

In view of the novelty of the subject matter, it is believed that a description of the theory of operation of, the material constituting, and a method of making pack 15 is in order for proper and full disclosure to enable one skilled in the art to practice the invention. The following paragraphs are provided for this purpose.

Figure 11:
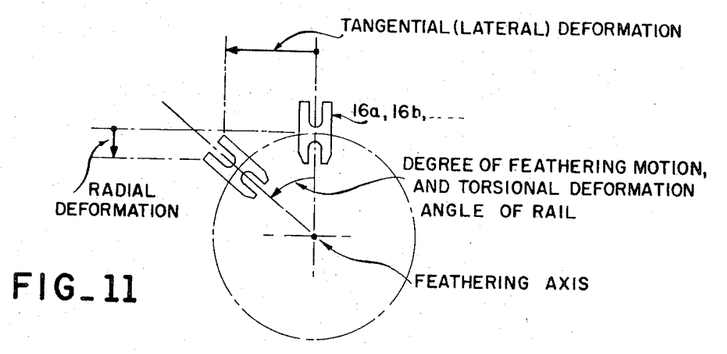
Figure 12:
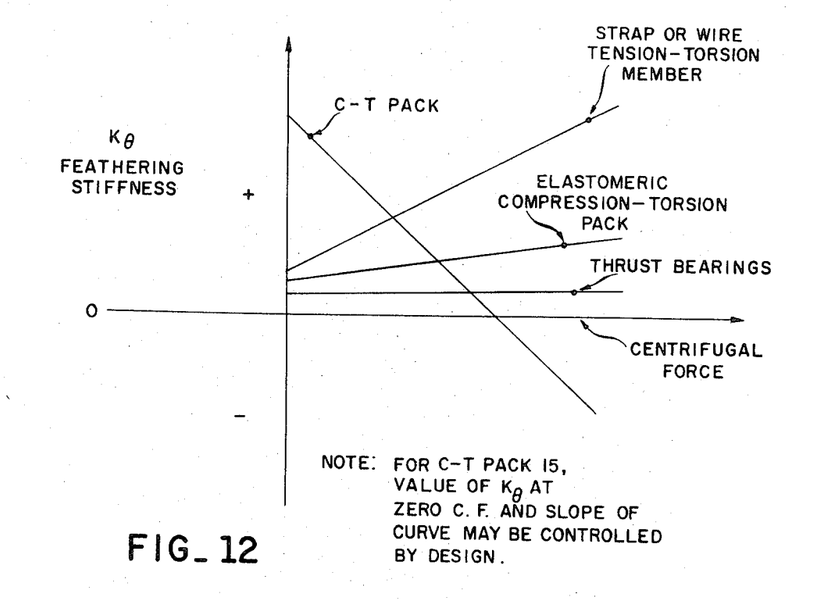

Each rail 16a, 16b, —, of the pack 15, under the action of centrifugal force and feathering motions, acts as a fixed-ended beam column (FIGS. 8 – 12). The ends 18, 19 are constrained in a fixed slope relationship but are free to displace laterally with respect to each other. Thus, when feathering motions are introduced into the hub assembly, one end of each rail 16a, 16b, —, moves circumferentially around the feathering axis with respect to the opposite inboard end 18 of the rail (FIG. 11). This circumferential motion may be resolved into three components of structural deformation: torsional, tangential, and radial. The radial deformations are relatively small, whereas the tangential deformation is relatively large. Since the radial deformation is always accompanied by twisting of the rail, the structural axes of the rail 16a, 16b, —, are rotating in such a way as to minimize bending stresses induced by this deformation. The magnitude of each deformation is dependent upon the length 2L of the rail, its radial distance R from the feathering axis, and the magnitude $\theta$ of the feathering motion.

The resultant stresses, torsional and bending, are functions of these motions, the stress developed by a centrifugal force P, the section and material properties of the rail, and the length of the rail. The distribution of the bending moments $M_F$ over the rail span is a function of the ratio of this relative level of centrifugal (compression) stress P to the column stability stress of the rail. The allowable column stress varies subtlely with feathering displacement. The stability is actually increased with increasing displacement, but the increment is small over the normal range of feathering motion. The net axial stress at any point in the rail is the sum of the net bending stresses and the centrifugal compression in pack 15.

An important design premise, substantiated by fatigue tests of the C-T pack 15, is that fatigue failure will not occur under the action of compression stress or, at worst, fatigue life under varying net compressive stress is several orders of magnitude greater than under corresponding levels of varying net tension stress. For this reason, it is advantageous to proportion the rails, situate the pack 15, and choose its material so that:
1. Centrifugal stress is maximized.
2. Bending stress is minimized.
3. Torsional shear is minimized.

The same parameters that control these conditions also control the feathering spring constant of the pack 15 and, in an indirect way, the drag of the hub 17. As in most spring design problems, the stiffness and strength requirements are generally conflicting. In this case, the presence of the centrifugal compression stress provides substantial relief to this conflict.

Considering the tangential deformation of one rail under centrifugal compression loads, which is the predominant structural consideration, the condition may be represented schematically as shown in FIGS. 8 – 12.

Figure 8:
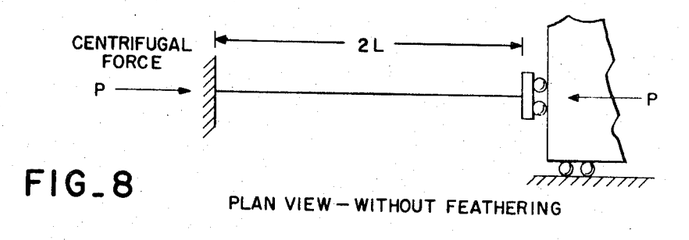
FIGS. 8 – 12 are schematic or free-body diagrams illustrating the theory and principles on which the invention is based.
Figure 9:
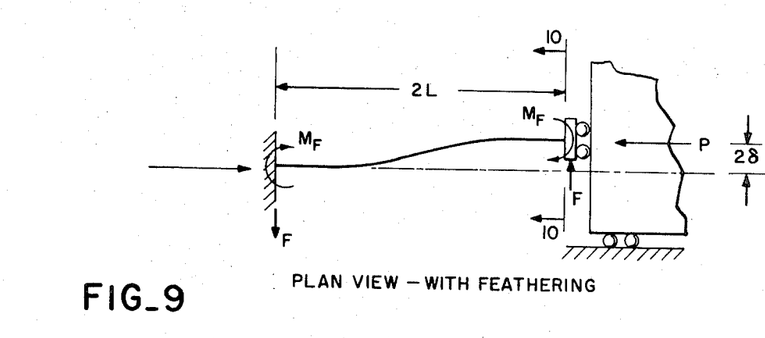
Figure 10:
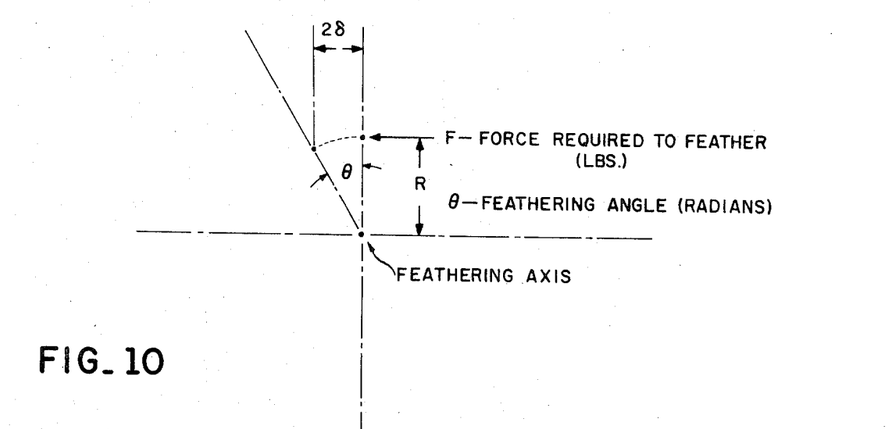

From equilibrium considerations, as applied to FIGS. 8 and 9, $$2 FL = - 2 P \delta + 2 M_F$$
$$F = - (P \delta/L) + M_F/L,$$

where
$M_F$ is the end moment in the rail 16a, 16b, —, due to its internal bending stiffness, and
2 $\delta$ is tangential movement of the rail (inches).
Generally,
$$M_F = 2 \delta \times f (E, I_{RAIL}, 2L, P),$$

where E is the modulus of elasticity of the rail, and I is the moment of inertia for the rail. The feathering spring constant $K_\theta$ is obtained as follows:

$$M_\theta = FR \text{ (in. lbs.)}$$
$$\theta = 2 \delta/R$$
$$K_\theta = M_\theta /\theta = FR^2/2\delta \text{ (in. lbs./radian)}$$

Therefore,
$$K_\theta = R^2/2L [- P + f (E, I_{RAIL}, 2L, P)].$$

Since
$$P = \sigma A,$$
where
$\sigma$ is the centrifugal compression stress (lbs./ sq. in.), and
A is the cross-sectional area of the rail in sq. inches, continuing,
$$K_\theta = - (\sigma A R^2/2L) + (R^2/2L) \times f (E, I_{RAIL}, 2L, P)$$
$$K_\theta = - (\sigma I_P/2L) + (R^2/2L) \times f (E, I_{RAIL}, 2L, P)$$
where
$I_P$ is the polar moment of inertia of the rail about the feathering axis (in.$^4$).

The total feathering stiffness, $K_{\theta_T}$, also includes the sum of the torsional stiffnesses of the individual rails, $\Sigma K \theta_{RAIL}$, which is a function of the axial load, rail shape, material and length. Thus:

$$K_{\theta_T} = - (\sigma I_P/2L + (R^2/2L) \times f(E, I_{RAIL}, 2L, P) + \Sigma K_{\theta_{RAIL}}$$

The function $f(E, I_{RAIL}, 2L, P)$ is a trigonometric function which decreases positively with increasing values of P, the centrifugal force. At zero centrifugal force, the function is positive. At centrifugal force equal to column buckling load for the rail, its value is zero. The other term in the expression, $-(\sigma I_{P/2L})$, is zero at zero centrifugal force and is increasingly negative with increasing centrifugal force.

The term $\Sigma K \theta_{RAIL}$ is positive at zero centrifugal force and diminishes with increasing centrifugal force, although this latter effect normally is quite small. Thus, since the feathering stiffness is the algebraic sum of these terms, it is evident that the stiffness will decrease with rotor rpm (increasing centrifugal force) and may be tailored to a high positive value at zero rpm for blade 20, diminishing to a smaller positive, zero or negative value as desired, at operating rpm. The feathering stiffness vs. rotor blade speed, or centrifugal force, characteristics are consequently quite different from those for a tension-torsion pack, an elastomeric compression-torsion pack, or thrust bearings. These characteristics are controllable by design, which is not the case for the other types of blade retention members, and may be chosen for advantage to the rotor and rotor control system in accordance with the graph depicted in FIG. 12.

In the case of the Lockheed, gyro stabilized, rigid rotor, it is desirable and advantageous to increase the positive stiffness in the feathering system as the rotor and gyro rpm decays, in order to prevent tumbling of the gyro and possible catastrophe. Such prevention is accomplished currently or conventionally by a rotor speed sensing switch which controls the hydraulic pressure to a negative loader on the swashplate. When rotor speed drops to a selected value, this switch deactivates the negative loader, leaving a positive mechanical spring bias on the gyro, which is hard connected to a swashplate. C-T pack 15 accomplishes this prevention automatically, without the need for sensing switches or hydraulic systems to furnish a variable negative loader. A full time, mechanical negative loader (preloaded spring) may be employed, which is simply overridden at low rpms by the high positive stiffness of the C-T pack 15. At operating rpms, the constant negative loader becomes effective because of the reduction in stiffness of the C-T pack.

The reduced stiffness of the pack at operating rpm is also of benefit in reducing collective control loads, simply by reducing the moment required to feather the blades. Cyclic control loads are governed by the feathering stiffness and the natural frequency in feathering of the rotor blades. The natural feathering frequency is partially dependent upon the mechanical feathering stiffness ($K_\theta$ of the pack), and may be tuned to an optimum value by proper design of the compression-torsion pack. This feature is generally not achievable with other blade retention members without the use of auxiliary devices, such as "chinese weights."

The pure, elastic, frictionless, feathering properties of the pack 15 are also of benefit to the control system and general vehicle response and stability characteristics. The inherent friction and/or hysteresis of the other systems are degrading to these characteristics, although not always to a serious degree. The current Lockheed gyro system is more sensitive to these effects than other control systems.

PACK MATERIAL AND MANNER OF MAKING

Each half-member 15a, 15b is forged from material processed as maraging steel, and known as type 300 Maraging steel forgings. The forged article is machined to form end portions 18, 19 and elements 16a, 16b, 16c constituting half-members 15a, 15b after which, members 15a, 15b are then aged in accordance with known methods for making and aging maraging steel. It is believed that members 15a, 15b may be machined in accordance with known or conventional methods, however, in view of the novelty of pack 15, a brief outline follows concerning a machining technique suitable for the disclosed embodiment.

Simple lathe turning and axial boring of a pair of forged articles, temporarily bolted, welded or clamped together, define the outer contour of the rails, and establishes the articles as a mated pair with close dimensional control of the holes 90, 92 (FIG. 6) for the feathering bearing shaft 36. The normal runouts of the lathe cuts are final, and require no additional machining. The inboard and outboard attaching holes 66, 96 are finish-bored with the pair still temporarily assembled. The center-to-center dimensional control of these hole locations is not critical for mating to the hub 17. This includes both shear pin and through-bolt holes. The halves are then match-markd as a pair and disassembled for the remaining machining operations.

Each half member 15a, 15b is mounted on an indexing head, with the head axis coincident with the feathering axis for a blade 20, for subsequent machining on a three-axis milling machine. Inside contour for each rail 16a, 16b, —, is cut with a ball cutter by a straightforward plunge, traverse and retract of the cutter. Detail cuts to finish the "H" shape of each rail 16a, 16b, —, and to separate the rails from each other are done similarly with ganged climb cutters. The use of ground spacers between the cutters in a gang maintains required tolerances on rail section thicknesses. These cuts are performed from the inside and outside of each rail 16a, 16b, —, using the indexing head to bring each rail into position for machining. A conical form cutter is used to finish the ends of the cuts separating the center rail from each of the side rails. The details of the end fitting portions 18, 19 are all simple milling cuts performed with the pack half 15a, 15b clamped directly to the machine bed. All of the above machining is done with the material in the soft condition, corresponding roughly to 4130 steel heat treated to 125000 psi ultimate tensile strength (U.T.S.). The parts are then aged at 900°F for about one hour, in air, for transformation hardening to Rockwell C 59. The matched halves 15a, 15b are then reassembled and the outside faces 100 of the material of inboard end fitting portions 18 are ground for overall thickness control.

It should be understood that we have included the location of bearing means 34 within the frame of pack 15; however, it should be understood that this is merely preferable. Bearing means 34 was incorporated within such frame primarily because of limitations of dimensional space, and it should be understood that it could be disposed inwardly of the attachment of pack member 15 to cuff-like member 58 and otherwise suitably connected in a known manner to cuff-like member 58 for functioning as one of the two feathering bearing means. In any event, bearings 34, 70 are isolated from pack 15; i.e., they should be able to slide axially inboardly and outwardly; otherwise, loads would not be carried by pack 15 but rather by the bearings themselves.

In the installation of a C-T pack 15 in a rigid rotor system, the outboard end of the pack must be attached at or close to a point on the fixed hub which corresponds in slope to the inboard end of the movable hub under flapping deformations.

Too, it should be noted that detailed design of the compression-torsion pack halves 15a, 15b as illustrated in this preferred embodiment emphasizes producibility considerations and mating requirements with the fixed and movable hubs, and that the invention is not necessarily limited by or to the illustrated pack 15.

Cuff-like member 58 may be integrally formed as part of blade 20 in the event that it is not desirous to fold a helicopter blade 20.

Pursuant to the requirements of the patent statutes, the principle of this invention has been explained and exemplified in a manner so that it can be readily practiced by those skilled in the art to which it pertains, such exemplification including what is presently considered to represent the best embodiment of the invention. However, it should be clearly understood that the above description and illustrations are not intended to unduly limit the scope of the invention, but that therefrom the invention may be practiced otherwise than as specifically described and exemplified herein, by those skilled in the art, and having the benefit of this disclosure.

We claim:

1. A compression-torsion pack comprising
   a pair of elongate components assembled together,
   a plurality of circumferentially spaced parallel rails in each of said elongate components, whereby upon such assembly of said components, said rails are disposed radially equidistant from a common center line for said pack, and mounting end portions integrally formed on opposite ends of and to said plurality of spaced rails for installment, such as in a rotor system.

2. The pack of claim 1 wherein each of said rails is H-configured in cross-section.

3. The pack of claim 1 including
means rigidly connecting said components together at both ends of the pack for assembly thereof,
means for securing said pack at the one end thereof to a structural member disposed at the other end of the pack and extending to said securing means, such as to a rotor blade in the rotor system,
means at the other end of said pack for installing the assembly to a structural member disposed at the one end of said pack and extending to said installing means, such as to a rotor hub in the rotor system, and
means for clamping the one end of said pack to the structural member disposed at the other end and extending to said clamping means to prevent the one end of said pack from rotating in an in-plane axis for said pack.

4. The pack of claim 3 including means defining a cavity at such one end,
said clamping means disposed in the cavity.

5. The pack of claim 4 including
a ball bearing means mounted on said shaft, said portion of said clamping means rotatably mounted thereon.

6. The pack of claim 4 wherein said clamping means includes
a shaft mounted across said cavity along the common center line for said pack and a portion of said clamping means about said shaft clamping upon the corresponding structural member.

7. An elongate, torsionally flexible and axially stiff blade retention member for isolating flapping and chordwise forces in a rotary wing vehicle having a hub assembly and rotor blade and comprising in combination,
a plurality of circumferentially spaced parallel elongate rails, said rails being disposed arcuately about and equidistant from a common center line for said member,
an inboard mounting end portion and an outboard mounting end portion each formed on a respective end of and to said plurality of rails,
means for installing said outboard mounting end portion to the hub assembly for the rotary wing vehicle,
means for securing said inboard mounting end portion to the rotor blade, and
means mounted at said inboard mounting end portion for fully constraining in vertical and horizontal movement said inboard mounting end portion.

8. The blade retention member of claim 7 wherein said securing means includes a pair of pins in opposing relationship and adapted to be connected to said inboard mounting end portion to the rotor blade.

9. The blade retention member of claim 8 wherein said securing means further includes bolt-nut means mounted through said pair of pins.

10. The blade retention member of claim 7 wherein said fully constraining means comprises
means defining a cavity in said inboard mounting end portion,
a shaft mounted in said cavity along the common center line for said member, and
clamping means rotatably mounted about said shaft and having a portion clampable to the rotor hub.

11. The blade retention member of claim 10 including
spherical bearing means mounted on said shaft in said cavity,
said portion of said clamping means being rotatably mounted thereon.

12. The blade retention member of claim 11 wherein said securing means includes a pair of pins in opposing relationship and adopted to be connected to said inboard mounting end portion to the rotor blade.

13. The blade retention member of claim 12 wherein said securing means further includes bolt-nut means mounted through said pair of pins.

14. The blade retention member of claim 13 wherein said bolt-nut means captures said shaft.

* * * * *